United States Patent [19]
Gold et al.

[11] Patent Number: 4,958,810
[45] Date of Patent: Sep. 25, 1990

[54] HYDRAULIC ENGINE MOUNT WITH DOMED ORIFICE PLATE

[75] Inventors: Thomas P. Gold, W. Chester; James P. Hamberg, Beavercreek; Darren K. Maness, Dayton; Richard A. Muzechuk, Kettering, all of Ohio

[73] Assignee: General Motors Corporation, Detroit, Mich.

[21] Appl. No.: 390,307

[22] Filed: Aug. 7, 1989

[51] Int. Cl.$^5$ .............................................. F16F 9/34
[52] U.S. Cl. .................................. 267/140.1; 267/219
[58] Field of Search ................ 248/562; 267/140.1 R, 267/140.1 A, 140.1 AE, 219

[56] References Cited
U.S. PATENT DOCUMENTS
4,588,173  5/1986  Gold et al. .................. 267/140.1
4,789,143  12/1988  Smith et al. ................ 267/140.1

FOREIGN PATENT DOCUMENTS
3508823  9/1986  Fed.Rep.ofGermany...267/140.1 AE

Primary Examiner—Duane A. Reger
Attorney, Agent, or Firm—Ronald L. Phillips

[57] ABSTRACT

A hydraulic mount assembly includes a pair of mounting members connected to each other through a hollow elastomeric body. The body is closed by a resilient diaphragm so as to form a cavity for damping liquid. A partition is provided to divide the fluid filled cavity into two distinct chambers. A primary chamber is formed between the partition and the interior wall of the body. A secondary chamber is formed between the partition and the interior wall of the diaphragm. The partition includes at least one orifice track connecting the two chambers. There is further provided a domed orifice plate in said primary chamber. The orifice within the orifice plate allows restricted fluid communication between the primary chamber and the flow passage in the partition. During operation, this orifice provides a passive tuning mechanism for the mount by lowering the dynamic rate at higher operating frequencies. This provides for a desirable softer, quieter mount at the higher frequencies and an improved balance of engine control/engine isolation in the mount.

3 Claims, 1 Drawing Sheet

HYDRAULIC ENGINE MOUNT WITH DOMED ORIFICE PLATE

TECHNICAL FIELD

The present invention relates generally to hydraulic mounts for vibration damping and, more particularly, to a vehicle mounted hydraulic mount assembly including an internal orifice plate providing dynamic rate and damping modification.

BACKGROUND OF THE INVENTION

A variety of mount assemblies are presently available to isolate vehicle vibrations, such as for automobile and truck engines and transmissions. One of the most popular mounts today is the hydraulic-elastomeric mount of the type disclosed in U.S. Pat. No. 4,588,173 to Gold et al., issued May 13, 1986 and entitled "Hydraulic-Elastomeric Mount".

The hydraulic mount assembly of this prior invention includes a reinforced, hollow rubber body that is closed by a resilient diaphragm so as to form a cavity. This cavity is partitioned by a plate into two chambers that are in fluid communication through a relatively large central orifice in the plate. The first or primary chamber is formed between the partition plate and the body. The secondary chamber is formed between the plate and the diaphragm.

A decoupler is positioned in the central orifice of the plate and reciprocates in response to the vibrations. The decoupler movement alone accomodates small volume changes in the two chambers. When, for example, the decoupler moves toward the diaphragm, the volume of the primary chamber increases and the volume of the secondary chamber decreases. In this way, at certain small vibratory amplitudes and high frequencies, fluid flow between the chambers is substantially avoided and undesirable hydraulic damping is eliminated. In effect, this freely floating decoupler is a passive tuning device.

In addition to the large central orifice, an orifice track with a smaller flow passage is provided, extending around the perimeter of the orifice plate. Each end of the track has one opening; one communicating with the primary chamber and the other with the secondary chamber. The orifice track provides the hydraulic mount assembly with another passive tuning component, and when combined with the freely floating decoupler provides at least three distinct dynamic modes of operation. The operating mode is primarily determined by the flow of the fluid between the two chambers.

More specifically, small amplitude vibrating inputs, such as from smooth engine idling or the like, produce no damping due to decoupling. On the other hand, large amplitude vibrating inputs produce high volume, high velocity fluid flow through the orifice track, and accordingly a high level of damping force and smoothing action. The high inertia of the hydraulic fluid passing through the orifice track contributes to the relatively hard mount characteristic in this mode. As a third (intermediate) operational mode of the mount, medium amplitude inputs produce lower velocity fluid flow through the orifice track generally resulting in a medium level of damping. In each instance, as the decoupler moves from one seated position to the other, a relatively limited amount of fluid can bypass the orifice track by moving around the sides of the decoupler to smooth the transition between the operational modes.

Recent developments in hydraulic mount technology have led to the advent of electronic control of the damping characteristics of the mount. Such a hydraulic mount is disclosed in the U.S. Pat. No. 4,789,143 issued Dec. 6, 1988, assigned to the assignee of the present invention. This prior invention represents an improvement over previous mounts in that it provides variable damping levels in response to sensed vehicle operating conditions. This active tuning of the mount is clearly a more sophisticated approach and has found general acceptance among engineers and others as an advance in the art. The tuning is actually accomplished by the use of an infinitely variable sliding gate for selectively varying the size of the opening to the orifice track between the two chambers. By varying the opening size, the flow of damping fluid and thus the damping action of the mount can be changed.

Another approach to active tuning involves providing an inflatable bellows in the primary chamber of the mount; Hydraulic Engine Mount with Air Bellows Tuning, Smith et al, Ser. No. 240,668, filed Sept. 6, 1988. Transducers and an electronic controller regulate the flow of air into/out of the bellows in order to control the damping effect of the mount.

Not only are these prior art mounts with active control proven to be successful in further modulating the response of the mount to vehicle operating conditions, but they can be programmed to operate in a manner particularly adapted to the vehicle configuration and the particular component, such as a motor or transmission, being damped. However, the disadvantage of these new and more sophisticated systems is the relatively higher cost of manufacturing and maintenance.

Thus, it would be desirable to have an alternative approach to these active systems. The alternative mount would employ passive damping features so as to be less expensive, but would be characterized by the ability to be designed and engineered to fit a particular set of operating parameters and conditions of a vehicle or component. Advantageously, the passive tuning means is to be self-contained and operate efficiently, without resort to electronic controllers, external transducers, microprocessors or the like.

SUMMARY OF THE INVENTION

Accordingly, it is a primary object of the present invention to provide a hydraulic mount assembly including a passive tuning means operative to tune the damping characteristics and provide operational improvements similar to the active tuning arrangements, especially at the resonant frequencies.

It is another object of the invention to provide a tunable mount assembly that is simple in design and low cost compared to other mounts, such as active tunable mounts.

It is another object of the invention to provide a tunable mount assembly that provides a reduction in the dynamic rate especially at higher operating frequencies and amplitudes and is quieter in operation.

Another object of the present invention is to provide an improved hydraulic mount assembly retaining the desirable damping characteristics of the passive tunable prior art mounts at low frequencies yet selectively reducing the dynamic rate at higher frequencies.

Another object of the present invention is to provide a hydraulic mount assembly that provides some of the same advantages as other tunable mounts, and is self-contained, reliable in operation and includes the advantage of simplified installation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a hydraulic mount assembly is provided to dampen and isolate engine and/or transmission vibrations during vehicle operation.

The preferred embodiment of the mount assembly selected to illustrate the invention includes a pair of mounting members connected to each other through a hollow elastomeric body. This hollow body is closed by a resilient diaphragm so as to form a cavity for receiving damping liquid, which may be a commercial engine antifreeze coolant. A partition or plate is provided to divide the fluid filled cavity into two distinct chambers. A primary chamber is formed between the partition and the interior wall of the hollow body. A secondary chamber is formed between the partition and the interior wall of the diaphragm. The partition includes a decoupler and a fluid passage or orifice track connecting the two chambers.

According to an important aspect of this invention, the mount assembly includes a domed orifice plate. The orifice plate is mounted adjacent the partition and the domed portion extends a distance into the primary chamber. Advantageously, and as will be described in more detail below, the orifice in the plate provides a passive tuning mechanism particularly adapted to reduce the dynamic rate characteristics of the mount at higher frequencies, improving the overall operation. The mount is provided with a generally softer damping action and can be tuned, especially to the resonant frequencies of a particular application on a vehicle.

In operation of the mount assembly of the present invention, vibration forces within the design amplitudes and frequencies produce alternate contractions/expansions of the hollow body and the primary chamber. When the vibration is initiated, the liquid first causes reciprocation of the decoupler. Certain small vibratory amplitudes usually produced at high frequencies, for example, such as during smooth engine idling are thus accomodated by the alternate increases and decreases in the chamber volumes resulting from decoupler reciprocation. As a result, significant fluid flow through the restricted orifice track between the chambers, and therefore damping, is avoided.

In contrast, during larger vibratory amplitudes, the decoupler reaches its limit of travel and ceases reciprocating. Upon cessation of the decoupling action, all of the damping fluid flow occurs between the primary and secondary chambers along an orifice track in the partition. The resistance to flow of the hydraulic fluid and the fluid inertia provide the damping action.

To explain further, upon contraction of the primary chamber, liquid entering the secondary chamber causes stretching of the diaphragm thereby increasing the volume of the secondary chamber. Upon reversal of the force, resulting in expansion of the primary chamber, the stretched diaphragm contracts forcing liquid back into the primary chamber, completing the damping cycle.

As vibration frequencies increase, the orifice within the domed plate adds a further dimension to the damping action. The fluid within the primary chamber must pass through the plate orifice traveling to and from the decoupler and orifice track. In effect, the orifice restricts the liquid flow between the chambers. The dynamic rate of the mount dips particularly at the higher frequencies since the fluid is slowed in reaching and passing through the orifice track.

Because the velocity of fluid is reduced in proportion to the size of the plate orifice, the damping action of the mount may be selected in accordance with the needs of the particular application. The smaller the orifice, the lower the frequency where the reduction in damping rate is initiated and the more of a dip the rate takes. The reduced velocity of the flow of damping fluid along the orifice track is the factor that advantageously reduces the noise of the mount at the higher frequencies. The resulting mount thus provides both a better feel or ride, and less noise over the standard (Gold-type) mount, especially at the higher operating frequencies.

In other words, the overall damping characteristics of the mount itself are improved especially at higher frequencies due mainly to lower velocity, smaller frictional forces in the fluid. This results in more desirable damping modulation over the full range of vehicle operating conditions. Advantageously, the hydraulic mount assembly of the present invention is entirely self-contained and does not require external hardware such as transducers, microprocessor controllers or the like. Therefore, the mount assembly is simpler to manufacture as well as install and maintain in the vehicle.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
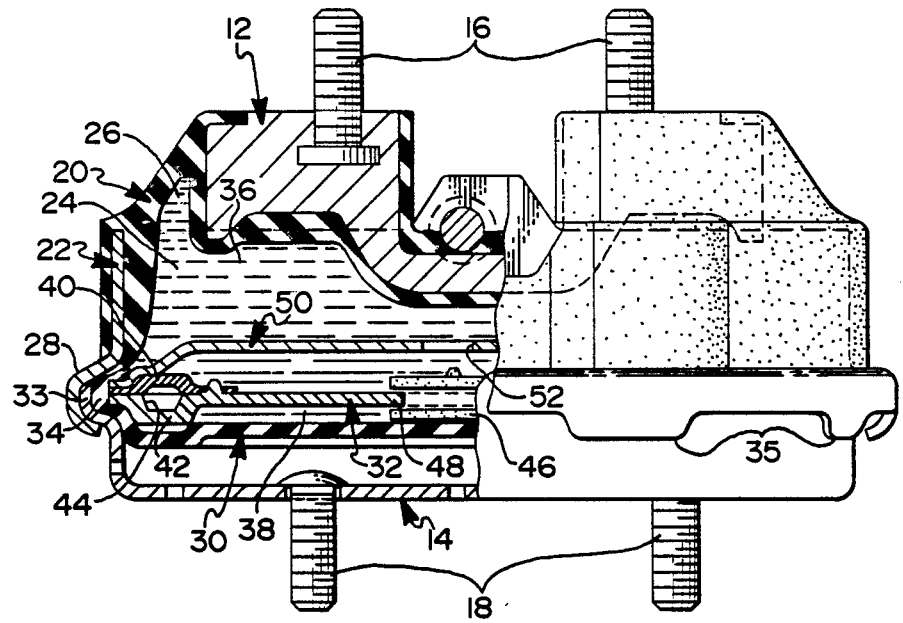
FIG. 1 is a partial cutaway view of the hydraulic mount assembly of the present invention.

Reference is now made to the drawing and particularly to FIG. 1 showing the present preferred embodiment in the form of an improved hydraulic elastomeric mount assembly 10. This mount is particularly adapted for mounting a component, such as an internal combustion engine or transmission in a vehicle. The mount assembly 10 can, of course, be used in applications other than engine or transmission mounts, where controlled damping of vibration is desired especially with a reduced damping action at higher frequencies.

The mount assembly shown in FIG. 1 includes a cast metal mounting member 12 and a stamped sheet metal mounting member 14. The mounting members 12 and 14 each include a pair of mounting studs 16, 18 respectively. These studs 16, 18 project outwardly from the mounting members 12, 14 for attachment respectively to an engine (not shown) and an engine supporting cradle or frame of a vehicle (not shown).

A hollow, flexible body 20 interconnects the mounting members 12, 14. The body 20 is constructed of an elastomeric material, such as natural or synthetic rubber. More specifically, the body 20 may be molded to and about the mounting member 12 and includes an embedded stamped sheet metal retainer 22.

The body 20 defines a hollow cavity 24 for receiving a damping liquid such as commercial engine antifreeze/coolant. Oppositely located voids 26 are formed in the body between the mounting member 12 and the retainer 22. These voids 26 provide some directional, dynamic rate control within the elastomeric body 20 and form a part of the damping liquid cavity 24.

Together, the mounting member 12, elastomeric body 20 and metal retainer 22 form a first subassembly or cover of the mount assembly. The retainer 22 includes an outwardly projecting collar 28 at its lower periphery. The collar 28 is formed to receive a second subassembly or base. The base comprises the mounting member 14, elastomeric diaphragm 30 and a partition 32 including flow orifices.

The elastomeric diaphragm includes an annular rim portion 34 having a peripheral groove formed between the upper and lower shoulders respectively. The shoulders are flexible so as to receive the outer edge of the partition 32. Thus, the partition 32 is sealingly engaged by the shoulders on opposite sides of the groove.

The mounting member 14 is formed with a collar 33 to receive the rim portion 34 of the diaphragm 30. The collar 33 of the member 14 fits within the collar 28 of the retainer 22. Tabs 35 are provided on the collar 28 and are bent over to retain and seal the whole mount assembly.

The elastomeric diaphragm 30 closes the elastomeric body 20 so as to form therewith the closed damping cavity 24. This cavity 24 is divided by the partition 32 into a primary chamber 36 enclosed by the elastomeric body 20 and a secondary chamber 38 enclosed by the diaphragm 30.

The partition 32 is formed of a non-magnetic material, and includes a pair of plates 40, 42 with matching peripheries. The plates 40, 42 span the cavity 24 and cooperate to define a damping orifice track 44 interconnecting the chambers 36, 38.

A decoupler 46 in the form of a rectangular plate is formed of metal or plastic and positioned in a central opening 48 within the partition 32. The decoupler 46 is mounted for a limited up and down reciprocal movement in the partition 32. The respective upper and lower faces of the decoupler 46 are engaged by the damping fluid within the primary and secondary chambers 36, 38. As a result, the decoupler 46 provides reciprocating movement in response to minimum amplitude alternating pressure buildups in the chambers 36, 38 acting on opposite faces of the decoupler. This reciprocating movement toward and away from the chambers 36, 38 produces a limited volume change in the primary and secondary chambers that effects hydraulic decoupling.

The flow passage or orifice track 44 is provided in the partition 32 to provide the main damping action of the mount assembly 10 through the flow of damping fluid between the primary and secondary chambers 36, 38 respectively. The orifice track 44 communicates between the two chambers via an opening in plate 40 (not shown) and an orifice in plate 42 (also not shown). The length of the track 44 can be varied to fine tune the particular resonance frequencies of the component being damped.

According to an important aspect of this invention, a domed orifice plate 50 is provided in the primary chamber 36. In effect, the orifice plate 50 entirely covers the partition 32 with the domed portion extending a distance into the primary chamber 36. Advantageously, and as will be described in more detail below, an orifice 52 within the orifice plate 50 provides a passive tuning mechanism for the mount assembly 10. The domed portion of the plate 50 functions to space the orifice 52 sufficiently away from the partition 32 so as to allow relatively free fluid circulation and to avoid interference with the decoupler 46.

During relatively smooth operation, such as during smooth engine idling, low amplitude, high frequency vibrations are produced. The decoupler 46 freely reciprocates in response to these low amplitude vibrations and the mount 10 provides very little damping effect.

As vibration amplitudes and frequencies increase, the decoupler 46 reaches the limit of its travel. At this point, damping fluid flow is initiated and occurs along the orifice track 44. This hydraulic fluid flow provides the desired damping action of the standard (Gold type) mount that is generally desirable for high amplitude (relatively low frequency) vibrations. At the higher frequencies, regardless of the cause (simply rough idle, or conversely maximum engine loading) the standard engine mount continues to provide a relatively high dynamic rate characteristic. However, at these frequencies and amplitudes, and especially at some resonant frequencies, it is desirable to have a softer acting, more engine isolating mount response. By the nature of the standard mount, the same high level that is desired under high amplitude and extreme conditions for maximum engine control has to be tolerated under all circumstances.

Figure 2:
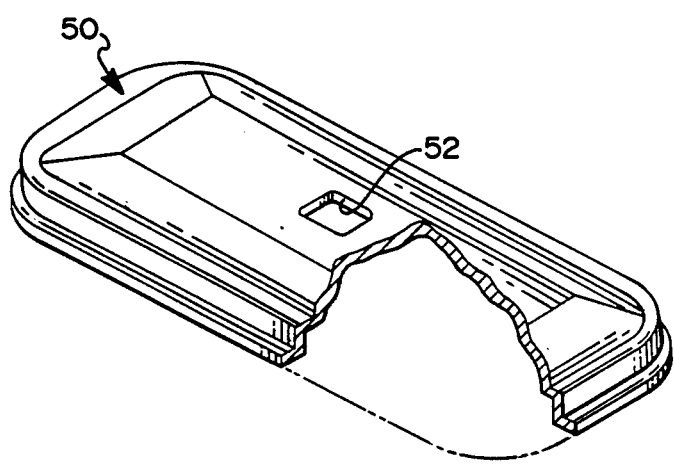
FIG. 2 is a cutaway perspective view of the domed orifice plate of the hydraulic mount assembly of the present invention.

In accordance with the present invention and as shown in FIGS. 1 and 2, the domed orifice plate 50 in the primary chamber 36 provides the solution. Advantageously, the orifice 52 within the domed plate 50 adds a further resistance to the flow of damping fluid within the chamber 36 and consequently a resistance to flow of fluid toward and away from the orifice track 44. This in turn results in a lesser flow velocity and volume of damping fluid along the orifice track 44, advantageously reducing the dynamic rate characteristics of the mount 10 at the higher frequencies. The resulting softer mount provides a better feel and less noise over the standard (Gold-type) mount at these higher operating frequencies.

It should be appreciated, that the orifice 52 is sized so as to present very little resistance at lower operating frequencies. Thus, it is only when the frequencies increase that the orifice 52 adds an appreciable, increasing resistance to the flow of fluid. In this way, the domed plate 50 containing the orifice 52 provides a passive tuning mechanism.

Further, the orifice 52 can be sized to meet the specific vehicle requirements. From experimentation, it is determined that by decreasing the area, the damping rate reduction begins at lower operating frequencies. The converse is also true. In other words, by increasing the area of the orifice 52, the rate modulation is delayed until proportionately higher frequencies are encountered. Advantageously, the rate reduction (regardless of the size of the orifice 52) is gradual. Therefore, a smooth transition to the lower dynamic rates is assured.

Also, although not fully understood, it is believed that the resistance to fluid flow through the domed plate orifice 52 itself is beneficial in smoothing the action of the mount in another manner. At the higher frequencies, when the lower rate, and consequently the softer feel is desired, the series effect of the small damping action through the orifice 52 in the primary chamber 36 coupled with the lessened damping action in the orifice track 44 smooths the damping action even more. The slower velocity, and generally laminar flow, through the orifice 52 assures the smooth damping and lower noise.

Advantageously, the hydraulic mount assembly 10 of the present invention is entirely self-contained and does not require external hardware such as vehicle mounted transducers, microprocessor controllers or the like. Therefore, the improved mount assembly 10 is simpler to manufacture as well as install onto the vehicle. Further, the lack of this additional hardware contributes to enhanced reliability by reducing system and component complexity.

In summary, numerous benefits result from employing the concepts of the present invention. The hydraulic mount assembly 10 includes a domed orifice plate 50 containing an orifice 52 within the primary chamber 36. The operation of the mount 10 at lower frequencies is substantially identical to the standard (Gold-type) mount, which is desirable. As the operating frequencies increase, the orifice 52 increasingly adds a further degree of resistance to the flow of damping fluid. This results in an advantageous reduction in dynamic rate at these higher frequencies. This provides a "softer" mount for improved engine isolation and vehicle response. Thus, a most desirable balance of engine control versus engine isolation is provided at all times throughout the entire range of vehicle operating conditions.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A hydraulic mount assembly, comprising:
a pair of mounting members;
a hollow body connected to said mounting members;
a resilient diaphragm closing said hollow body and forming therewith a closed cavity that is filled with liquid;
means for partitioning said cavity into a primary chamber and a secondary chamber enclosed by said diaphragm;
an orifice track in said partitioning means connecting said chambers so as to effect damping;
an orifice plate spaced from and coextensive with said partitioning means and spanning said primary chamber;
an orifice of fixed size in said orifice plate in series communication with said orifice track for passively reducing the liquid flow between said chambers at higher operating frequencies so as to reduce dynamic rate.

2. A hydraulic mount assembly, comprising:
a pair of mounting members;
a hollow body connected to said mounting members;
a resilient diaphragm closing said hollow body and forming therewith a closed cavity that is filled with liquid;
means for partitioning said cavity into a primary chamber and a secondary chamber enclosed by said diaphragm;
a first orifice track in said partitioning means connecting said chambers so as to effect damping; and,
a second orifice in fluid communication and in series with said first orifice, whereby said second orifice cooperates with said first orifice to effect a passive dynamic rate reduction.

3. A hydraulic mount assembly, comprising:
a pair of mounting members;
a hollow body connected to said mounting members;
a resilient diaphragm closing said hollow body and forming therewith a closed cavity that is filled with liquid;
means for partitioning said cavity into a primary chamber and a secondary chamber enclosed by said diaphragm; said partitioning means including at least one orifice track communicating between said chambers;
a domed plate positioned in said primary chamber, an orifice in said plate to restrict flow in said primary chamber, whereby flow to and from said orifice track is reduced so as to provide a passively controlled dynamic rate reduction.

* * * * *